(12) United States Patent
Schaal

(10) Patent No.: US 6,634,690 B2
(45) Date of Patent: Oct. 21, 2003

(54) BUILT-IN ASHTRAY AND BEVERAGE CONTAINER RECEIVER COMBINATION FOR A VEHICLE

(75) Inventor: Falk Schaal, Alpirsbach (DE)

(73) Assignee: Fischer Automotive Systems GmbH, Horb (DE)

( * ) Notice: Subject to any disclaimer, the term of this patent is extended or adjusted under 35 U.S.C. 154(b) by 0 days.

(21) Appl. No.: 10/292,569

(22) Filed: Nov. 12, 2002

(65) Prior Publication Data

US 2003/0090130 A1 May 15, 2003

(30) Foreign Application Priority Data

Nov. 14, 2001 (DE) .......................................... 101 55 798

(51) Int. Cl.[7] .............................. B60R 7/04; B60N 3/08; B60N 3/10
(52) U.S. Cl. .................... 296/37.1; 296/37.8; 296/37.9; 224/484; 224/926; 248/311.2
(58) Field of Search ................................ 296/37.1, 37.5, 296/37.8, 37.9, 37.12, 37.14; 224/483, 484, 485, 486, 926; 248/311.2

(56) References Cited

U.S. PATENT DOCUMENTS

| | | | | |
|---|---|---|---|---|
| 4,286,742 A | * | 9/1981 | Pellegrino | 224/281 |
| 4,568,117 A | | 2/1986 | McElfish et al. | |
| 4,708,386 A | * | 11/1987 | Moore et al. | 296/37.8 |
| 4,712,823 A | * | 12/1987 | Mills et al. | 296/37.8 |
| 4,818,008 A | * | 4/1989 | Cressoni | 296/37.8 |
| 4,927,108 A | * | 5/1990 | Blazic et al. | 248/311.2 |
| 5,102,181 A | * | 4/1992 | Pinkney | 296/37.12 |
| 5,505,417 A | * | 4/1996 | Plocher | 248/311.2 |
| 5,533,772 A | * | 7/1996 | Volkers et al. | 296/37.9 |
| 5,800,005 A | * | 9/1998 | Arold et al. | 296/37.12 |
| 5,887,596 A | * | 3/1999 | Ziegler et al. | 131/231 |
| 6,045,173 A | * | 4/2000 | Tiesler et al. | 296/37.8 |
| 6,065,729 A | * | 5/2000 | Anderson | 248/311.2 |
| 6,158,795 A | * | 12/2000 | Gray et al. | 296/37.8 |

FOREIGN PATENT DOCUMENTS

| | | | | |
|---|---|---|---|---|
| DE | 198 54 245 A1 | 5/2000 | | |
| DE | 199 08 130 A1 | 8/2000 | | |
| EP | 0 748 717 A1 | 12/1996 | | |
| JP | 08127277 A | * | 5/1996 | B60N/3/10 |
| JP | 08132969 A | * | 5/1996 | B60R/7/06 |

* cited by examiner

Primary Examiner—D. Glenn Dayoan
Assistant Examiner—Patricia Engle
(74) Attorney, Agent, or Firm—Michael J. Striker

(57) ABSTRACT

A built-in combination (10) for use in a motor vehicle includes an ashtray (14) that is displaceable forwards into an inaccessible position and rearwards into an accessible position. A receiving element (24) having an insertion opening (28) for a beverage container is arranged at the rear side of the ashtray (14). The receiving element is pivotally connected to the ashtray (14), thus taking up a position of use when the ashtray (14) is displaced forwards. In the position of use, a beverage container can be inserted into the insertion opening (28).

4 Claims, 5 Drawing Sheets

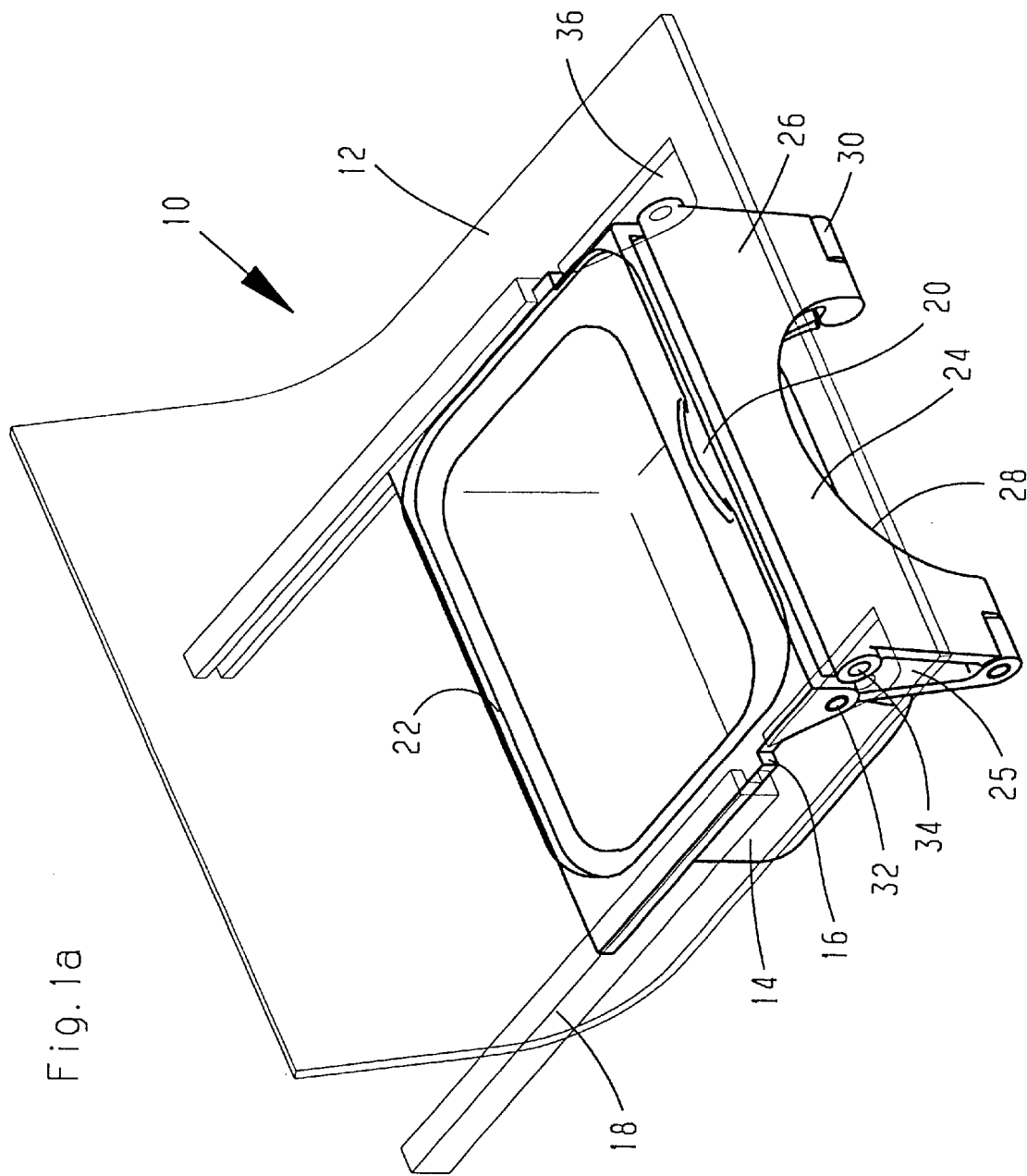

BUILT-IN ASHTRAY AND BEVERAGE CONTAINER RECEIVER COMBINATION FOR A VEHICLE

BACKGROUND OF THE INVENTION

The present invention relates to a built-in combination for use in a means of locomotion, especially for use in a motor vehicle.

The built-in combination comprises a container open at the top, for example, an ashtray or a storage compartment, and a receiving element having an insertion opening for a beverage container, for example, a beverage can, a beaker, or a cup. The built-in combination is intended for horizontal installation in the center console of a motor vehicle, for example.

Holders for beverage containers are known in a wide variety of constructions and embodiments for different types of applications. A wide variety of constructions of built-in ashtrays for motor vehicles are also known.

The invention is based on the problem of combining in a space-saving manner an open receptacle, such as an ashtray or a storage compartment, for example, with a holder or receiving element for a beverage container.

SUMMARY OF THE INVENTION

According to the present invention, the built-in combination comprises a cover, which is intended for approximately horizontal arrangement in the means of locomotion. In this connection, the horizontal arrangement is an intended built-in position. The cover can be a component part, especially a top side, of the center console of a motor vehicle. The cover has an opening, the size and shape of which correspond approximately to those of the receptacle open at the top. The receptacle and the receiving element are arranged beneath the cover in the intended built-in position of the built-in combination.

Furthermore, the built-in combination, according to the present invention, comprises a sliding guide, which guides the receptacle slidingly approximately horizontally on the underside of the cover. The receptacle is slidable to beneath the opening in the cover, so that it is accessible from above, and the receptacle is displaceable away from the opening in the cover so that it is not accessible. The receiving element and the receptacle are connected to one another so that displacement of the receptacle moves the receiving element. If the receptacle is pushed away from the opening in the cover, the receptacle moves the receiving element to it to beneath the opening in the cover, so that a beverage container can be inserted into the insertion opening of the receiving element. If the receptacle is displaced to beneath the opening in the cover, the receptacle moves the receiving element away from the opening in the cover. In that case, only the receptacle is accessible.

The present invention has the advantage that a receptacle and a receiving element for a beverage container can be housed in a space-saving manner, for example, in the center console of a motor vehicle. In particular, the built-in combination can be housed in such a manner that the receptacle, when it is pushed away from the opening in the cover, is located in extension thereof in front of the center console and underneath the dashboard of the motor vehicle. That space is otherwise normally not used. Further advantages of the present invention are that it makes possible an alternative use of the receptacle and the receiving element, and also allows a structurally simple construction of the built-in combination.

In a preferred form of the invention, the receiving element is pivotally connected to the receptacle by means of hinge joint, so that the receiving element, when it is not in use, can be pivoted downwards. In this manner, the receiving element can be housed in a space-saving manner when not in use.

One form of the invention provides a hinge joint, fixed to the cover, for the receiving element. When the hinge joint is fixed to the cover, the hinge joint is not displaced in relation to the cover in the built-in state of the built-in combination.

In order to house the receiving element in a space-saving manner when it is not in use, one construction of the invention provides for the receiving element to be constructed with at least two parts that are pivotally connected with one another by means of a hinge joint. When not in use, the two parts of the receiving element can be pivoted together, which can also be described as folding of the receiving element.

BRIEF DESCRIPTION OF THE DRAWINGS

FIGS. 1a–c shows a first embodiment of a built-in combination in accordance with the present invention in three different positions;

DETAILED DESCRIPTION OF THE PREFERRED EMBODIMENTS

Figure 1B:
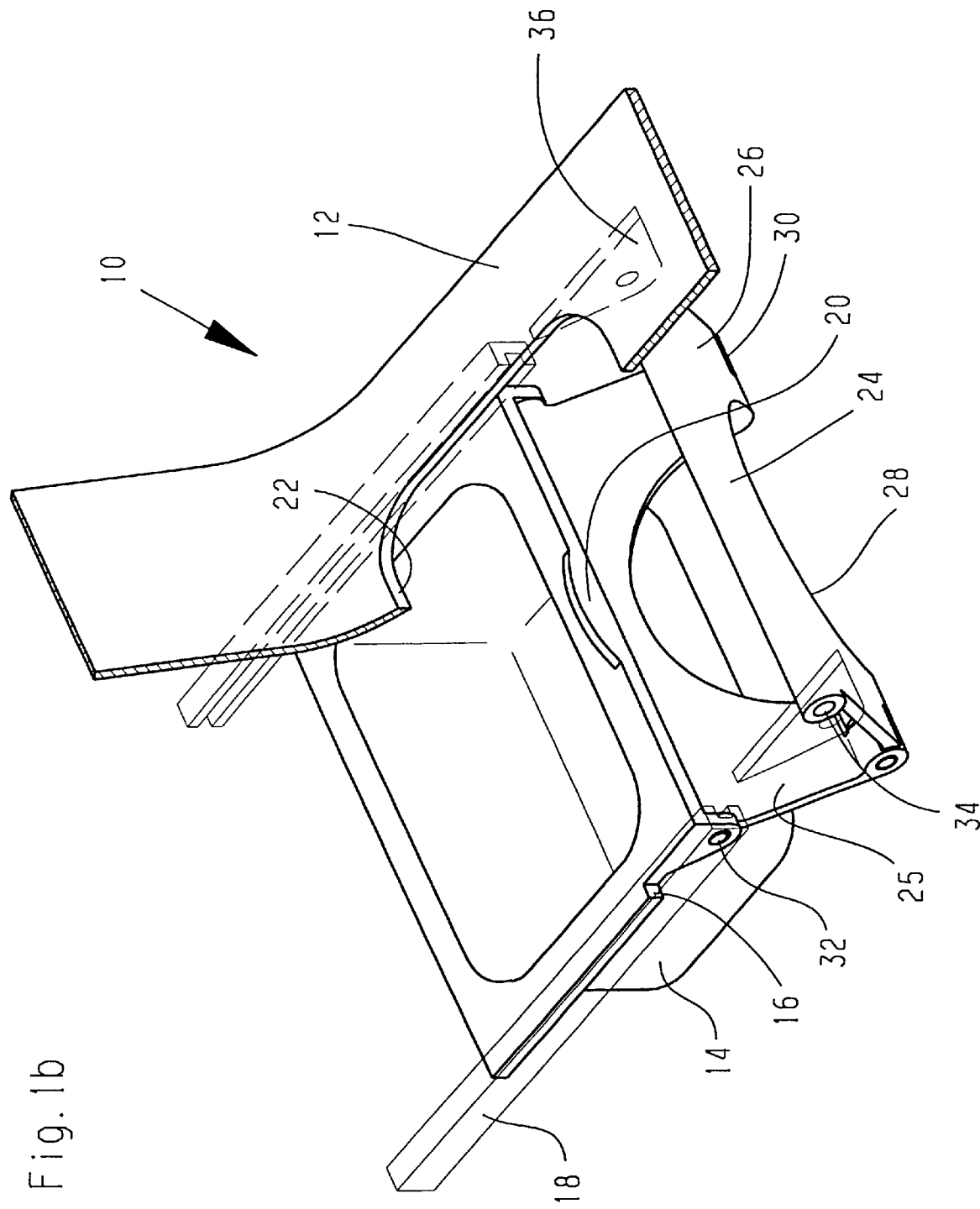

The built-in combination 10 according to the present invention illustrated in FIG. 1a is intended for building into, for example, the center console of a motor vehicle (not illustrated). The built-in combination comprises a plate-form cover 12, which is arranged horizontally in a prescribed built-in position and in a front region runs in a curve obliquely upwards. The cover 12 can be part of the center console (not otherwise shown) of a motor vehicle, namely, the top side of such a center console. In its front region, it merges into a central part of a dashboard, which is lead downwards in a vehicle means as far as the center console. The cover 12 is shown broken away in FIGS. 1a–c so that components of the built-in combination 10 located beneath it are visible.

A receptacle open at the top, in the embodiment of the invention illustrated and described, an ashtray 14, is arranged on the underside of the cover 12. In plan view, the ashtray 14 is of rectangular form; strip-form tongues 16 project laterally from its top side, and are slidably received in guide rails 18. The guide rails 18 are integral with the cover 12 and arranged on the underside thereof and run parallel to one another and in the lengthwise direction. The guide rails 18 have a C-shaped cross-section, that is, they comprise a channel on facing inner sides that is continuous in the lengthwise direction, in which the tongues 16 of the ashtray 14 are slidingly received. Together with the tongues 16, the guide rails 18 form a sliding guide for the ashtray 14, by means of which the ashtray 14 is slidably guided in the lengthwise direction on the underside of the cover 12. The ashtray 14 can be displaced out of the position shown in FIG. 1a via an intermediate position shown in FIG. 1b into the position shown in FIG. 1c, and back. FIGS. 2a–c correspond to FIGS. 1a to c, that is, respectively, they show the same position of the ashtray 14. For displacement, the ashtray 14 has an upwardly projecting rib on its top surface as handle 20. The cover 12 is provided with a rectangular opening 22, through which the ashtray 14 is accessible in its pushed-rearward position, illustrated in FIGS. 1a and 2a. In its pushed-forward position, shown in FIGS. 1c and 2c, the ashtray 14 is not accessible.

A receiving element 24 for a beverage container, such as, for example, a beverage can, a cup, or a beaker, having a circular insertion opening 28 in the embodiment of the invention that is illustrated and described, is arranged on the rear side of the ashtray 14. In FIGS. 1a–c and 2a–c, the receiving element 24 comprises two plate-form parts 25, 26, which are pivotally connected to one another by a hinge 30. A front part 25 of the receiving element 24 is pivotally connected with the ashtray 14 by means of a pin bearing 32 on each side of the ashtray 14. A rear part 26 of the receiving element 24 is pivotally mounted with a pin bearing 34 in bearing brackets 36, which are integral with the cover 12 and project from the underside thereof. All three pivoting axes defined by the hinge 30 and the pin bearings 32, 34 are arranged parallel to one another, horizontal and transversely to the sliding guide 16, 18 of the ashtray 14.

Figure 1C:
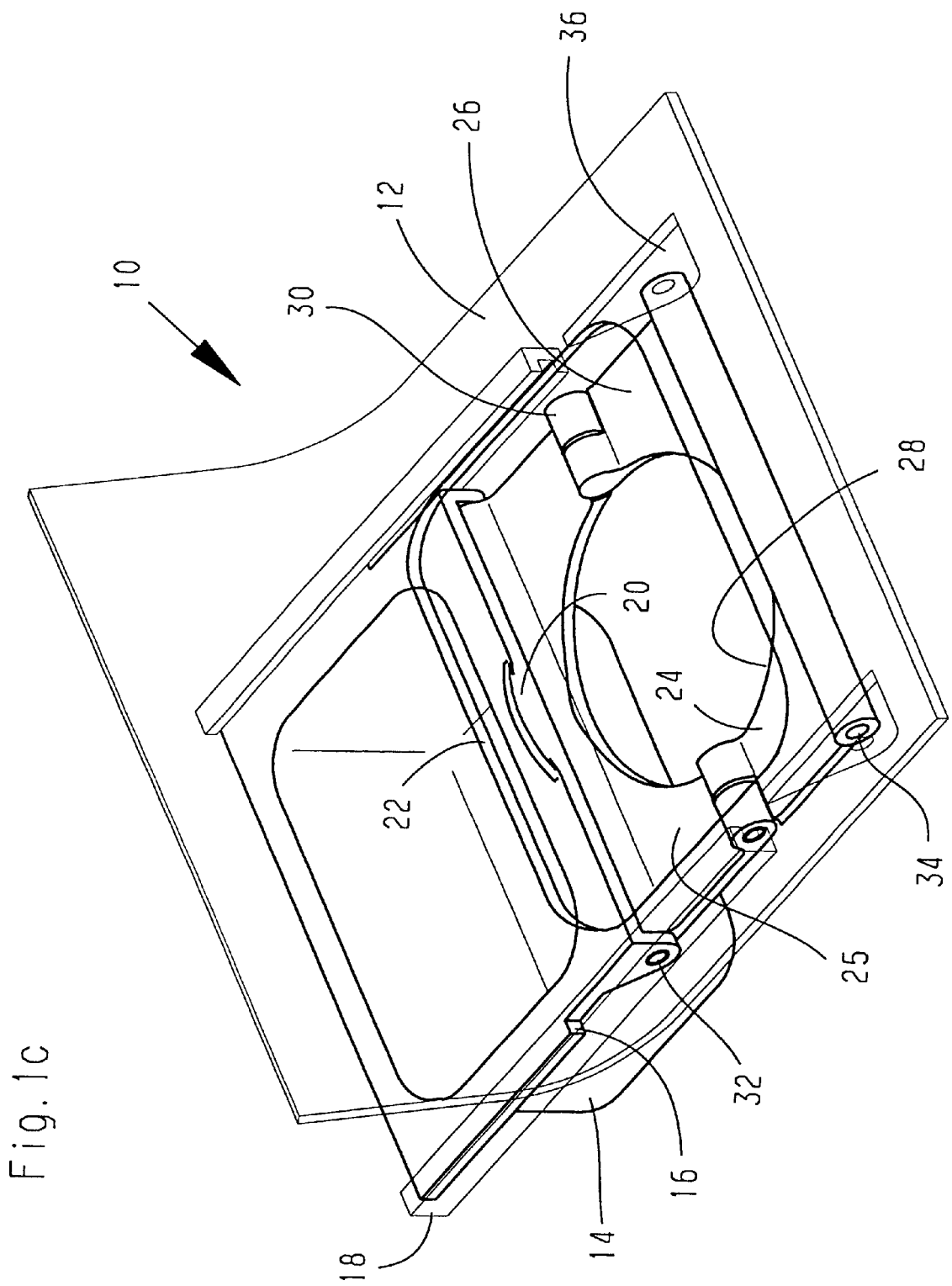
Figure 2A:
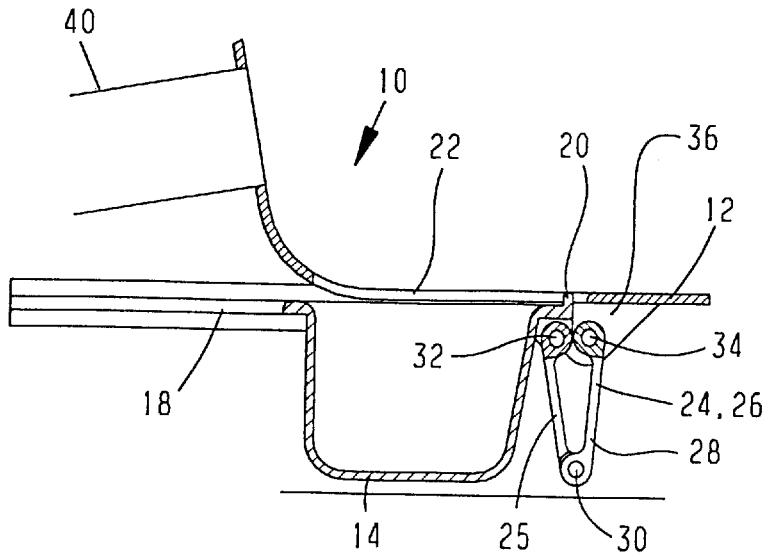
FIGS. 2a–c show the built-in combination of FIGS. 1a–c in longitudinal section.
Figure 2B:
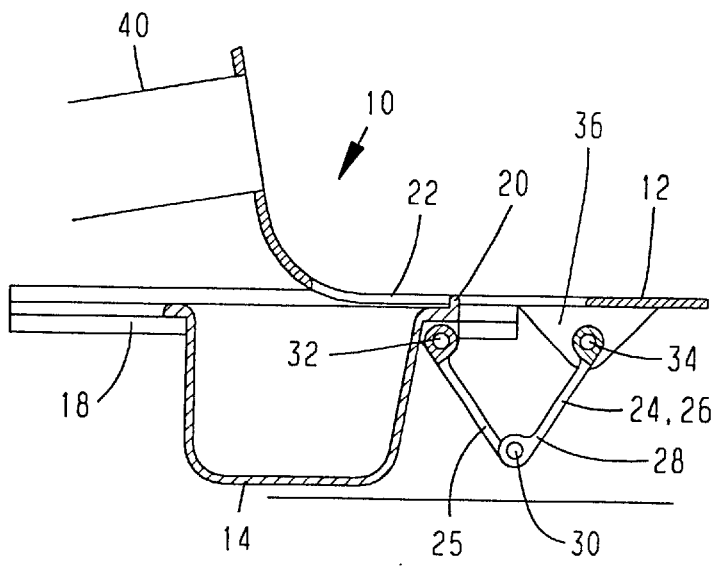
Figure 2C:
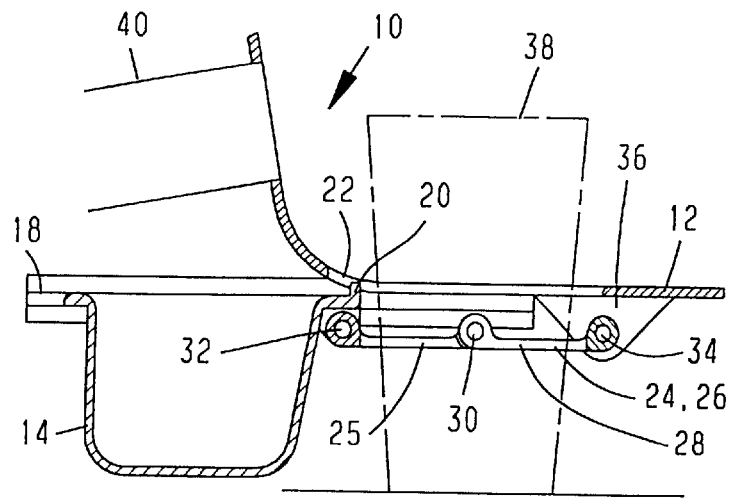

On displacement of the ashtray 14 into the front position illustrated in FIGS. 1c and 2c, the two parts 25, 26 of the receiving element 24 take up a horizontal position parallel to and beneath the cover 12. The insertion opening 28 is located underneath the opening 22 in the cover 12, so that a beverage container, such as the beaker 38 shown by dash-dot lines in FIG. 2c, for example, can be inserted into the insertion opening 28. If the ashtray 14 is displaced into its rear position, shown in FIGS. 1a and 2a, the two parts 25, 26 of the receiving element 24 fold downwards at the hinge 30, so that they are housed hanging approximately vertically and hence in space-saving manner against the rear side of the ashtray 14.

In its pushed-forward position, illustrated in FIGS. 1c and 2c, the ashtray 14 is located in front of the center console of the motor vehicle, underneath the dashboard. The ashtray 14 is located beneath an installation space 40 for a car radio or the like, for example, that is, in a space that is otherwise unused.

Figure 3A:
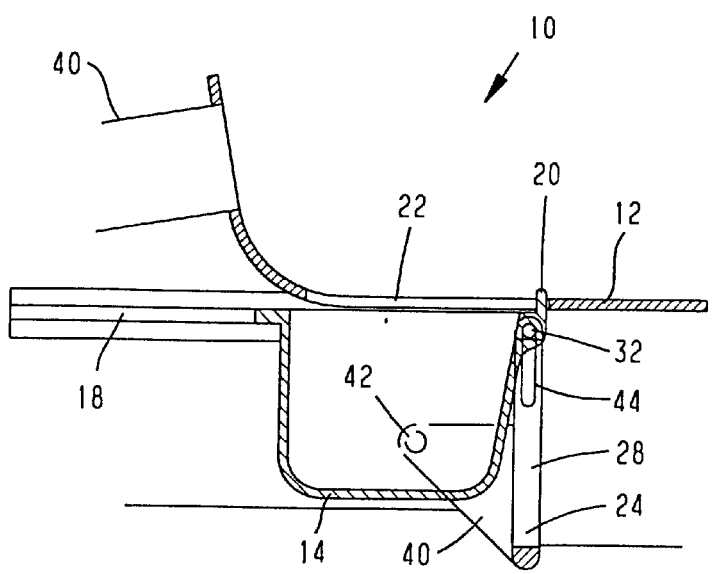
FIGS. 3a–c show a second exemplary embodiment of a built-in combination according to the present invention, in different positions.
Figure 3B:
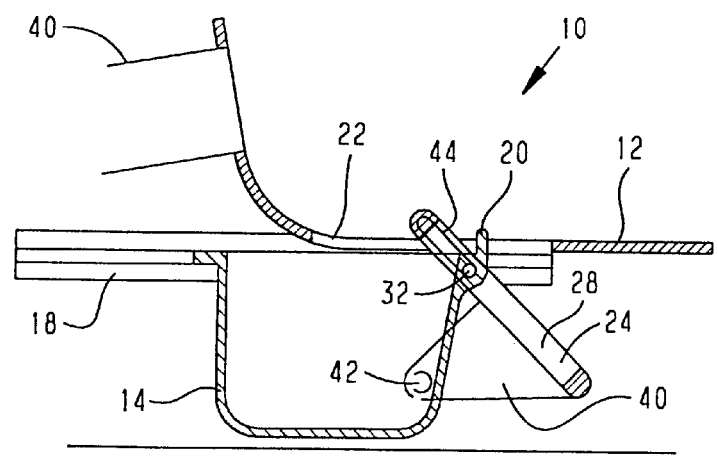
Figure 3C:
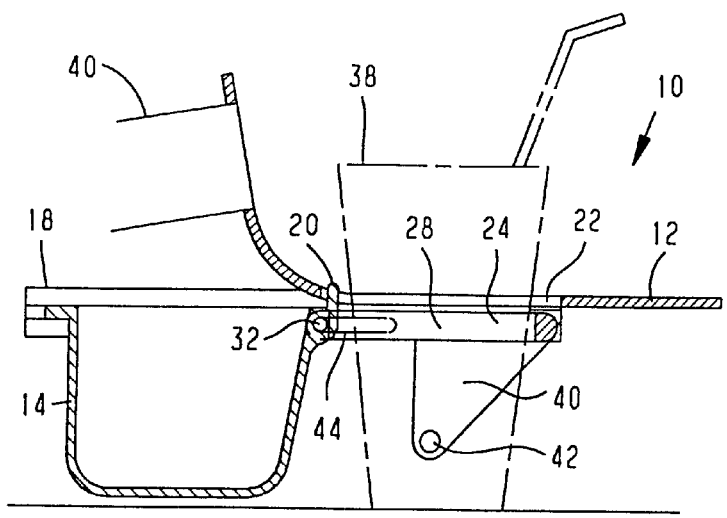

In FIGS. 3a to 3c, the same reference numerals are used for components corresponding to those in FIGS. 1a–c and 2a–c. The receiving element 24 of the built-in combination 10 from FIGS. 3a–c is in one piece and consists of a plate-form part having a rectangular outline and a circular insertion opening 28. Supporting ribs 40 that are triangular in side-view project downwards from the plate-form receiving element 24 on each side thereof. The supporting ribs 40 have bearing pins 42 that are rotatably mounted in bearing holes on the sides of the center console (not otherwise shown) of the motor vehicle. At a front end, the plate-form element 24 is pivotally mounted with pin bearings 32 laterally on the rear side of the ashtray 14. Longitudinal grooves 44 in the receiving element 24, in which bearing pins of the pin bearings 32 are rotatably and displaceably located, allow limited displaceability of the receiving element 24 with respect to the ashtray 14.

With the exception of the above-described receiving element 24, the built-in combination 10 illustrated in FIGS. 3a–c is of the same construction as the built-in combination 10 illustrated in FIGS. 1a–c and 2a–c, and functions in the same way. To avoid repetition, the reader is referred with respect to FIGS. 3a–c to the above description relating to FIGS. 1a–c and 2a–c.

If the ashtray 14 of the built-in construction 10 illustrated in FIGS. 3a–c is displaced rearwards, as illustrated in FIG. 3a, and is thus accessible through the opening 22 in the cover 12, then the receiving element 24 is pivoted backwards and downwards into an approximately vertical position against the rear side of the ashtray 14. If the ashtray 14 is displaced forwards, it moves the receiving element 24 with it until the latter is positioned beneath the opening 22 of the cover 12, when the ashtray 14, as illustrated in FIG. 3c, has been displaced all the way to the front. In that position, a beverage container, such as the beaker 38, for example, can be inserted into the insertion opening of the receiving element 24.

It will be understood that each of the elements described above, or two or more together, may also find a useful application in other types of constructions differing from the types described above.

While the invention has been illustrated and described herein as a built-in combination for use in a means of location, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Built-in combination for use in a means of locomotion, having a receptacle open at the top and having a receiving element for a beverage container, wherein said receiving element has an insertion opening for a beverage container, characterized in that the built-in combination (10) comprises a cover (12), wherein said cover (12) is intended for an approximately horizontal arrangement in the means of locomotion, said cover (12) having an opening (22) and beneath which the receptacle (14) and the receiving element (24) are arranged, wherein the built-in combination (10) comprises a sliding guide (16, 18), wherein said sliding guide slidingly guides the receptacle (14) approximately horizontally on an underside of the cover (12) to beneath the opening (22) of the cover (12) and away from the opening (22) of the cover (12), and wherein the receiving element (24) and the receptacle (14) are connected with one another so that the receiving element (24) is moved with its insertion opening (28) to beneath the opening (22) in the cover (12) when the receptacle (14) is displaced away from the opening (22) in the cover (12) and so that conversely, the receiving element (24) is moved away from the opening (22) in the cover (12) when the receptacle (14) is displaced to beneath the opening (22) in the cover (12).

2. Built-in combination according to claim 1, wherein the receiving element (24) is pivotally connected by means of a hinge (32) to the receptacle (14).

3. Built-in combination according to claim 1, wherein the built-in combination (10) comprises a hinge (34; 42) fixed to the cover, wherein by means of said hinge, the receiving element (24) is pivotally mounted.

4. Built-in combination according to claim 1, wherein the receiving element (24) comprises two parts (25, 26) and a hinge (30), wherein said hinge connects the two parts (25, 26) pivotally with one another.

* * * * *